United States Patent
Hed et al.

(10) Patent No.: US 9,463,666 B2
(45) Date of Patent: *Oct. 11, 2016

(54) AERODYNAMIC BICYCLE RIM AND WHEEL

(71) Applicant: Hed Cycling Products, Inc., Shoreview, MN (US)

(72) Inventors: Steven Arthur Hed, North Oaks, MN (US); Christopher Andrew Edin, Mahtomedi, MN (US)

(73) Assignee: Hed Cycling Products, Inc., Shoreview, MN (US)

( * ) Notice: Subject to any disclaimer, the term of this patent is extended or adjusted under 35 U.S.C. 154(b) by 73 days.

This patent is subject to a terminal disclaimer.

(21) Appl. No.: 14/520,207

(22) Filed: Oct. 21, 2014

(65) Prior Publication Data

US 2015/0102657 A1  Apr. 16, 2015

Related U.S. Application Data

(63) Continuation of application No. 12/553,026, filed on Sep. 2, 2009, now Pat. No. 8,888,195.

(60) Provisional application No. 61/185,489, filed on Jun. 9, 2009.

(51) Int. Cl.
*B60B 21/02* (2006.01)
*B60B 21/10* (2006.01)

(52) U.S. Cl.
CPC ............ *B60B 21/025* (2013.01); *B60B 21/02* (2013.01); *B60B 21/10* (2013.01); *B60B 2900/1216* (2013.01); *B60B 2900/50* (2013.01); *B60Y 2200/134* (2013.01)

(58) Field of Classification Search
CPC ..... B60B 21/02; B60B 21/025; B60B 21/10; B60B 2900/1216; B60B 5/02; B60Y 2200/134
USPC ...... 301/95.101, 95.102, 95.104, 55, 58, 62, 301/67
See application file for complete search history.

(56) References Cited

U.S. PATENT DOCUMENTS

| 339,550 A | 4/1886 | Hudson |
| 362,472 A | 5/1887 | Warwick |

(Continued)

FOREIGN PATENT DOCUMENTS

| DE | 30 16 862 A1 | 11/1981 |
| FR | 2 583 680 | 12/1986 |
| RU | 2096188 C1 | 11/1997 |

OTHER PUBLICATIONS

"Specialized Bicycle Components Accessory Catalog, 1990," 17 pgs., Hed Design, White Bear Lake, MN, US.

(Continued)

*Primary Examiner* — Kip T Kotter
(74) *Attorney, Agent, or Firm* — Sprinkle IP Law Group

(57) ABSTRACT

Embodiments described herein provide aerodynamic bicycle rims and wheels. Embodiments can include a bicycle rim that is wider than the width of the tire proximate to the outer edge of the rim and is shaped so that there is a tangent line tangent to the rim and the tire. The tangent line can be tangent to the rim on the sidewall or elsewhere on the rim. The widest part of the rim can be radially inward from the outer edge of the rim or elsewhere on the rim and the tangent line can be tangent at the widest part of the rim or elsewhere on the rim.

15 Claims, 11 Drawing Sheets

(56) References Cited

U.S. PATENT DOCUMENTS

| | | |
|---|---|---|
| 365,091 A | 6/1887 | Owen |
| 382,658 A | 5/1888 | Nickerson |
| 436,993 A | 9/1890 | Overman |
| 697,118 A | 4/1902 | Van Horn |
| 810,860 A | 1/1906 | Heart |
| 1,968,005 A | 7/1934 | Swain |
| 1,969,088 A | 8/1934 | Maranville |
| 2,938,738 A | 5/1960 | Borup et al. |
| 3,452,798 A | 7/1969 | Ravreby |
| 3,656,531 A | 4/1972 | Ross et al. |
| 3,862,779 A | 1/1975 | Jayne |
| 4,266,417 A | 5/1981 | Imamura et al. |
| 4,280,736 A | 7/1981 | Raudman |
| 4,508,392 A | 4/1985 | LeBlond et al. |
| 4,639,046 A | 1/1987 | Oleff et al. |
| 4,732,428 A | 3/1988 | Monte |
| 4,793,659 A | 12/1988 | Oleff et al. |
| 4,844,552 A | 7/1989 | Tsygankov et al. |
| 4,919,490 A | 4/1990 | Hopkins et al. |
| 4,995,675 A | 2/1991 | Tsai |
| 5,061,013 A | 10/1991 | Hed et al. |
| 6,145,937 A | 11/2000 | Chen |
| 6,767,069 B2 | 7/2004 | Chen |
| 7,029,074 B2 | 4/2006 | Chen |
| 8,888,195 B1 | 11/2014 | Hed et al. |
| 2009/0195055 A1 | 8/2009 | Chen |
| 2012/0062021 A1* | 3/2012 | Lew ........................ B29C 70/44 301/95.103 |

OTHER PUBLICATIONS

"Mar. 1989 Product Price List," 1 pg., Hed Design, White Bear Lake, MN, US.
"ZIPP 3000 Composite Molded Wheel Specification Sheet," 1 pg., Hed Design, White Bear Lake, MN, US.
Hed-X aluminum bike rim, Triathlete Magazine, p. 19, Jun. 1989.
"ZIPP 3000 Data Sheet," 6 pgs., Compositech, Indianapolis, IN, U.S.
"Aerospoke Advertising Brochure," 2 pgs., Aerospoke Corp., Milford, MI, US.
Office Action for U.S. Appl. No. 07/424,492, mailed Aug. 3, 1990, 5 pgs.
Notice of Allowability for U.S. Appl. No. 07/424,492, mailed Apr. 25, 1991, 3 pgs.
Office Action for U.S. Appl. No. 12/553,026, mailed Oct. 3, 2011, 12 pgs.
Office Action for U.S. Appl. No. 12/553,026, mailed Apr. 12, 2012, 11 pgs.
Greenwell, D.I. et al., "Aerodynamic characteristics of low-drag bicycle wheels," Aeronautical Journal, Mar. 1995, 10 pgs.
Office Action for U.S. Appl. No. 12/553,026, mailed Sep. 19, 2012, 12 pgs.
Portions of Zipp Speed Weaponry 2006 Catalog, 25 pgs., Zipp Speed Weaponry, Indianapolis, IN, US.
Portions of Zipp Speed Weaponry 2007 Catalog, 26 pgs., Zipp Speed Weaponry, Indianapolis, IN, US.
Portions of Zipp Speed Weaponry 2008 Catalog, 17 pgs., Zipp Speed Weaponry, Indianapolis, IN, US.
Portions of Zipp Speed Weaponry 2009 Catalog, 16 Pgs., Zipp Speed Weaponry, Indianapolis, IN, US.
"New Product Spotlight: Zipp 303 Cyclocross Tubular Wheels—The Pro's Choice for 2009?", Cyclocross Magazine, Aug. 23, 2009, 5 pgs. at <www.cxmagazine.com/new-product-spotlight-zipp-303-tubular-cyclocross-carbon-wheels>, retrieved on Sep. 25, 2012.
Office Action for U.S. Appl. No. 12/553,026, mailed Feb. 12, 2013, 10 pgs.
Hed Cycling Products Brochure, 2007, 7 pgs., Hed Cycling, Shore View, MN, US.
Hed Cycling Products Brochure, Apr. 2005, 23 pgs., Hed Cycling, White Bear Lake, MN, US.
Hed Cycling Products Brochure, 1999, 29 pgs., Hed Cycling, White Bear Lake, MN, US.
Office Action for U.S. Appl. No. 12/553,026, mailed Jul. 11, 2013, 8 pgs.
Office Action for U.S. Appl. No. 12/553,026, mailed Dec. 27, 2013, 10 pgs.
Machine-generated English translation of RU 2096188 C1.

* cited by examiner

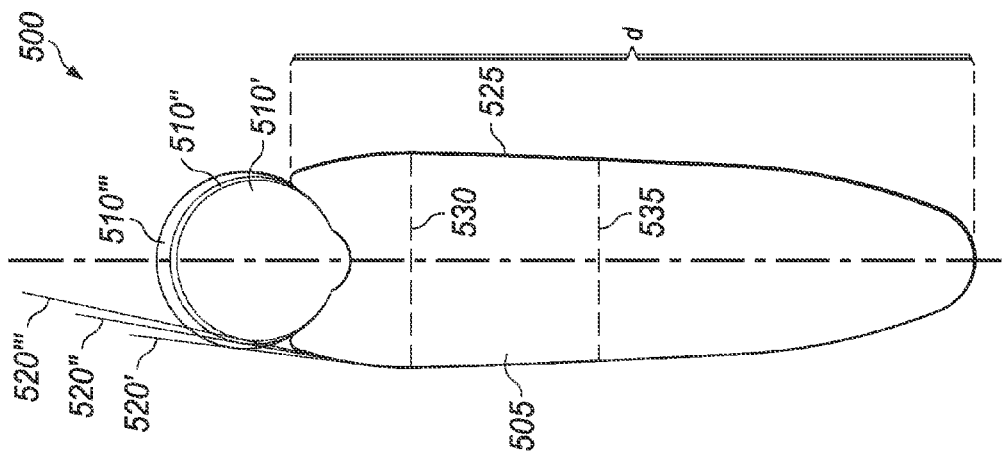
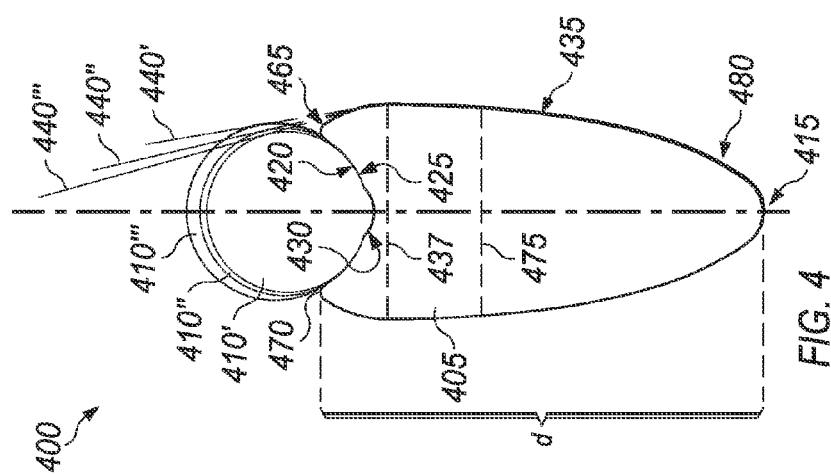
FIG. 5
FIG. 4

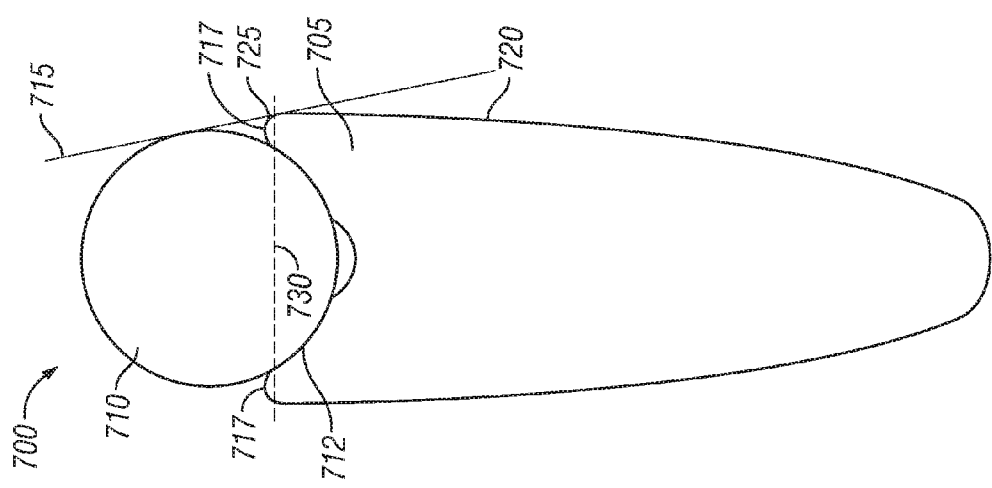
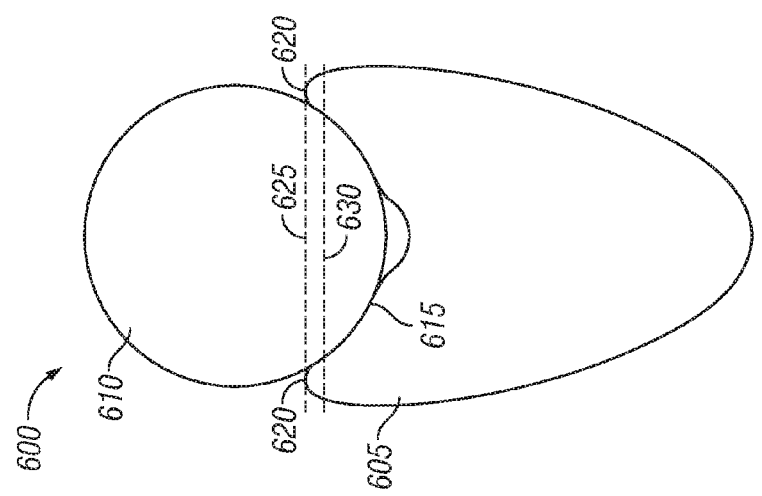

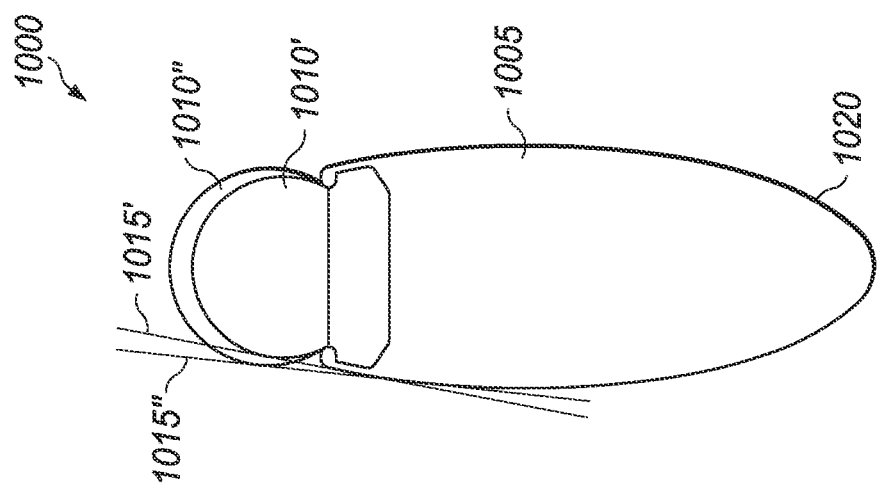
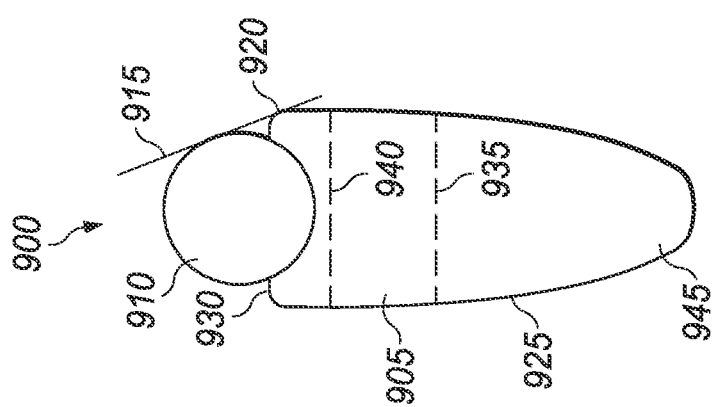

AERODYNAMIC BICYCLE RIM AND WHEEL

RELATED APPLICATIONS

This application is a continuation of, and claims a benefit of priority under 35 U.S.C. 120 of the filing date of U.S. patent application Ser. No. 12/553,026 filed Sep. 2, 2009, entitled "Aerodynamic Bicycle Rim and Wheel", which in turn claims the benefit of priority under 35 U.S.C. §119(e), to U.S. Provisional Patent Application No. 61/185,489 filed Jun. 9, 2009, entitled "Aerodynamic Bicycle Rim and Wheel", by Hed et al., which is hereby fully incorporated by reference herein.

TECHNICAL FIELD

This application is related to bicycle wheels. More particularly, this application describes systems bicycle rims and wheels with increased stall angles and decreased drag.

BACKGROUND

Drag or wind resistance is a major force acting against the movement of a cyclist. Greater drag requires a cyclist to exert more energy to maintain or increase speed. This is particularly important in bicycle racing in which riders must conserve energy over long distances and races can be won or lost in a matter of seconds.

One way in which to reduce drag is to make components more aerodynamic. In the past 20 years, new designs have been developed to reduce the drag caused by airflow over the wheels. Some manufacturers have produced rims so that the rim and tire form an oval (elliptical) shape with the rim being narrower than the tire at the outer edge of the rim and widest part of the rim occurring at the minor axis of the ellipse. This shape has been modified in some products to have parallel braking surfaces near the outer portion of the rim.

Such wheels are made with the assumption that the airflow will be head-on to the cyclist. In practice, however, side winds cause air flow to come from angles to the side of the wheel, causing previous wheels to stall and lose aerodynamic efficiency.

SUMMARY

Embodiments described herein provide aerodynamic bicycle rims and wheels. One embodiment can include an aerodynamic bicycle rim having a circumferential tire mounting surface on an outer side of the bicycle rim forming a tire seat to seat a tire. The rim can also include a set of sidewalls extending from a nose of the bicycle rim to a transition to the circumferential tire mounting surface to form a bicycle rim body having a cross-section that is wider than the width of the tire proximate to the outer edge of the bicycle rim. The bicycle rim is operable to seat the tire so that there is a tangent line tangent to the tire and tangent to a sidewall of the bicycle rim.

The widest portion of the bicycle rim can occur anywhere along the rim including at the outer edge of the rim, at the outer part of the sidewall (at the beginning of the transition from the sidewall to the tire mounting surface) or at another point of the rim. The cross-section of the wheel and rim can be substantially elliptical or asymmetrical. The tangent line can be tangent to the rim on the sidewall or another portion of the rim and can be tangent to the rim at the widest portion of the rim or other portion of the rim. By way of example, but not limitation, example tangent angles range from 7-17 degrees from the lateral centerline. The shape of the rim can be selected so that the rim and tire have a selected stall angle. In one embodiment, the stall angle can be up to about 20 degrees. In particular embodiments, the rim shape can be selected to exhibit a stall angle of 8-19.5 degrees.

Another embodiment can comprise a bicycle rim having circumferential tire mounting surface on an outer side of the bicycle rim forming a tire seat to seat a tire and a set of sidewalls, with the sidewalls from a nose of the bicycle rim to a transition to the circumferential tire mounting surface to form a bicycle rim body. The bicycle rim is wider than the width of the tire proximate to the outer edge of the bicycle rim. Additionally, the bicycle rim can be shaped so that there is a tangent line tangent to the tire and tangent to the bicycle. The cross-section of the bicycle rim and tire can be asymmetrical about a centerline of the cross-section.

Embodiments described herein provide an advantage over previous bicycle rims and wheels by providing increased stall angles for a similar depth rim.

Embodiments described herein, provide another advantage providing reduced drag.

For bikes, such as mountain bikes, in which aerodynamics is are less of a concern, embodiments of rims described herein can provide other advantages such as potentially reducing the likelihood of pinch flats (a flat tire caused when a hard object, such as a rock, causes a tire to bottom out on the rim pinching the inner tube of the tire against the rim).

Embodiments described herein can also allow more adhesive to be used to adhere a tire to the rim and provide more side support for the tire, thereby decreasing the likelihood of rollouts and increasing safety.

BRIEF DESCRIPTION OF THE FIGURES

A more complete understanding of the embodiments and the advantages thereof may be acquired by referring to the following description, taken in conjunction with the accompanying drawings in which like reference numbers indicate like features and wherein:

FIG. 4 is a diagrammatic representation of another embodiment of a cross-section of a rim and tire;

FIG. 5 is a diagrammatic representation of another embodiment of a cross-section of a rim and tire;

FIG. 6 is a diagrammatic representation of another embodiment of a cross-section of a rim and tire;

FIG. 7 is a diagrammatic representation of another embodiment of a cross-section of a rim and tire;

FIG. 9 is a diagrammatic representation of another embodiment of a cross-section of a rim and tire;

FIG. 10 is a diagrammatic representation of another embodiment of a cross-section of a rim and tire;

DETAILED DESCRIPTION

Figure 1:
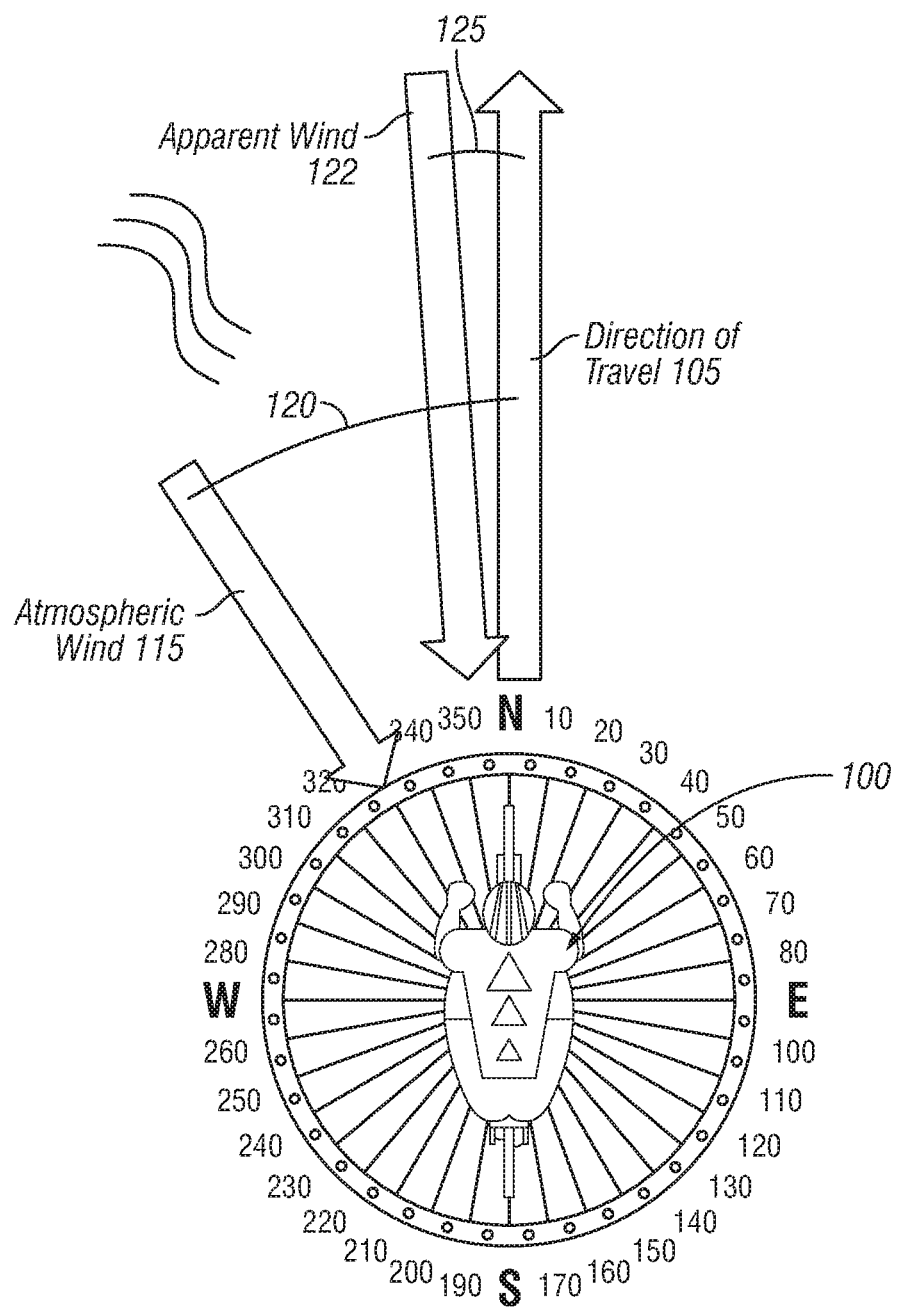
FIG. 1 is a diagrammatic representation illustrating meteorological wind, apparent wind and yaw.

The disclosure and various features and advantageous details thereof are explained more fully with reference to the exemplary, and therefore non-limiting, embodiments illustrated in the accompanying drawings and detailed in the following description. Descriptions of known starting materials and processes may be omitted so as not to unnecessarily obscure the disclosure in detail. It should be understood, however, that the detailed description and the specific examples, while indicating several embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Embodiments described herein include bicycle rims and wheels that provide increased aerodynamics compared to previous bicycle rims and wheels. In particular, embodiments described herein provide bicycle rims and wheels that exhibit increased stall angles and reduced drag over a greater range of wind angles in comparison to previous rims and wheels.

Before proceeding, it may be helpful to define several phrases used when discussing the aerodynamics of bicycles. Meteorological (true) wind angle: wind angle experienced by a stationary observer. In this definition, the direction the observer faces is 0 degrees. Meteorological wind is the angle from which the wind is blowing naturally. Apparent wind: air flow felt by the cyclists because of the combination of the meteorological wind and the movement of the cyclist. Apparent wind angle: the angle of the actual flow of air acting on the wheels of a moving cyclist. Because the observer (cyclist) is moving, the apparent wind is the relative angle of the wind in relation to the observer. Yaw angle: the angle of airflow when the wheel orientation front to back is zero degrees. Assuming a moving cyclist, yaw angle is the same as apparent wind angle. Stall angle: the yaw angle at which airflow cannot remain laminar as it both passes over and exits the wheel surface. Laminar airflow is advantageous and increases the aerodynamic efficiency of the wheel and results in faster rider speeds for a given effort. Non-laminar airflow is turbulent and decreases aerodynamic efficiency. Non-laminar airflow slows a rider's speed at a given amount of effort.

FIG. 1 illustrates the concepts of apparent wind and yaw (apparent wind angle). Apparent wind is the wind experienced by an object from the combination of the object moving through air and meteorological wind blowing on the object. In FIG. 1, a cyclist 100 is riding in direction 105 at 27 mph and the wind indicated at 115 is blowing at 10 mph at angle 120, in this example −30° to cyclist 100 (for purposes of this disclosure, negative angles are to left of the bicycle and positive angles are to the right of the bicycle). The wind felt by cyclist 100 is a combination of airflow created by the cyclist's movement and the meteorological wind. In this example, the bicycle will encounter an apparent wind 122 of 36 mph at an apparent wind angle 125 (also referred to as yaw) of −8°. If, the cyclist slows down to 24 mph, but the meteorological wind stays the same, the apparent wind will be 33 mph with an apparent wind angle of −8.7°. This shift in apparent wind angle occurs because the meteorological wind becomes a relatively larger component of the apparent wind.

The velocity of apparent wind can be characterized by EQN 1 as follows:

$$A = ((W^*(\cos(a)-V)^2 + (W^*\sin(a))^2)^{0.5} \quad [\text{EQN 1}]$$

where:
W=meteorological wind speed
a=angle of meteorological wind to rider where 0=headwind and 180=tailwind
V=velocity of the rider
The apparent wind angle or yaw can be characterized by:

$$b = \arccos\left(\frac{W\cos a - V}{\sqrt{(W\cos a - V)^2 + (W\sin a)^2}}\right)$$

where b=apparent wind angle.

When a bicycle is in motion, airflow over a bicycle's wheels results from the apparent wind. For wheels that are designed to be aerodynamic only in a head wind, the airflow over the wheel will be relatively smooth for angles close to head-on, but become turbulent at greater angles, thereby increasing drag. The angle relative to the wheel at which this transition from attached to disturbed flow occurs is referred to as the stall angle. Apparent winds having a yaw greater than the stall angle result in increased drag.

Embodiments of bicycle wheels described herein can exhibit increased stall angles and therefore maintain aerodynamic efficiency through a greater range of conditions. Various embodiments of bicycle rims described herein can be shaped to seat a tire of a selected size or range of sizes. The rim is shaped so that the rim is wider than the tire at or proximate to the outer edge of the rim. This allows the tire to act as a fairing for the wheel to promote attached airflow along the rim. Additionally, the rim can be shaped so that there is a tangent line that is tangent to the tire and a sidewall of the rim. The tangent line can be tangent to the sidewall at any desired point along the sidewall of the rim including at the widest part of the rim or other point along the sidewall. The widest part of the rim can occur at any point in the rim, including, but not limited to, the center of the cross-section of the rim, the center of the cross-section of the rim and tire, the inner third or outer third of the rim. The wheel with the tire mounted can be asymmetrical or symmetrical about the centerline of the rim and tire. Asymmetry can result, in various embodiments, from the placement of the widest portion of the rim, the nose shape, the sidewall shape or a combination of factors. In other embodiments the wheel can be symmetrical about the centerline of the rim and tire.

In another embodiment, the rim can be shaped so that there is a tangent line tangent to the tire and tangent to the rim at any point on the rim including the sidewalls, the tire seating surface, the transition between the tire seating surface and the sidewall or other point on the rim. The tangent line can be tangent to the rim at the widest part of the rim or another portion of the rim.

Embodiments described herein can be applied to with wire spokes, wheels with a smaller number of aerodynamic spokes and disc wheels. The wheels can be used for any type of bicycle including road bikes, mountain bikes, recumbent bikes or other bikes. Rims can be shaped to have a desired stall angle.

Figure 2:
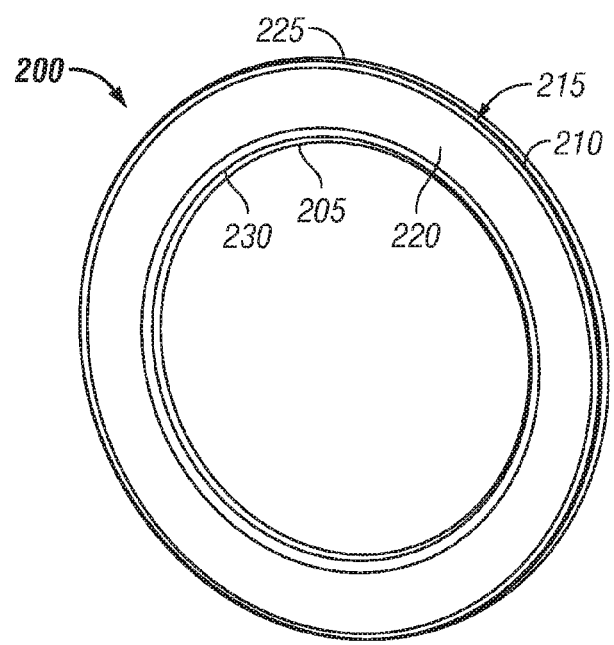
FIG. 2 is a diagrammatic representation of one embodiment of a rim.

FIG. 2 is a diagrammatic representation of one embodiment of a bicycle rim 200 having an annular body extending radially from radially inner edge 205 to a radially outer edge 210. A tire can mount to rim 200 at a circumferential tire mounting surface 215. Sidewall 220 extends from inner edge 205 to tire mounting surface 215. The transition 225 from sidewall 220 to tire mounting surface 215 can be a square corner, an area of decreased radius compared to the remainder of sidewalls 220 or have another shape to transition from sidewalls 220 to circumferential tire mounting surface 215. The sidewalls 220 can form a nose 230 proximate to inner edge 205. Sidewalls 220 can include any desired features including, but not limited to dimpling, parallel brake surfaces, flat brake surfaces, curved brake surfaces or other features. As discussed in more detail below, rim 200 can be shaped to increase the stall angle of a bicycle wheel.

Figure 3:
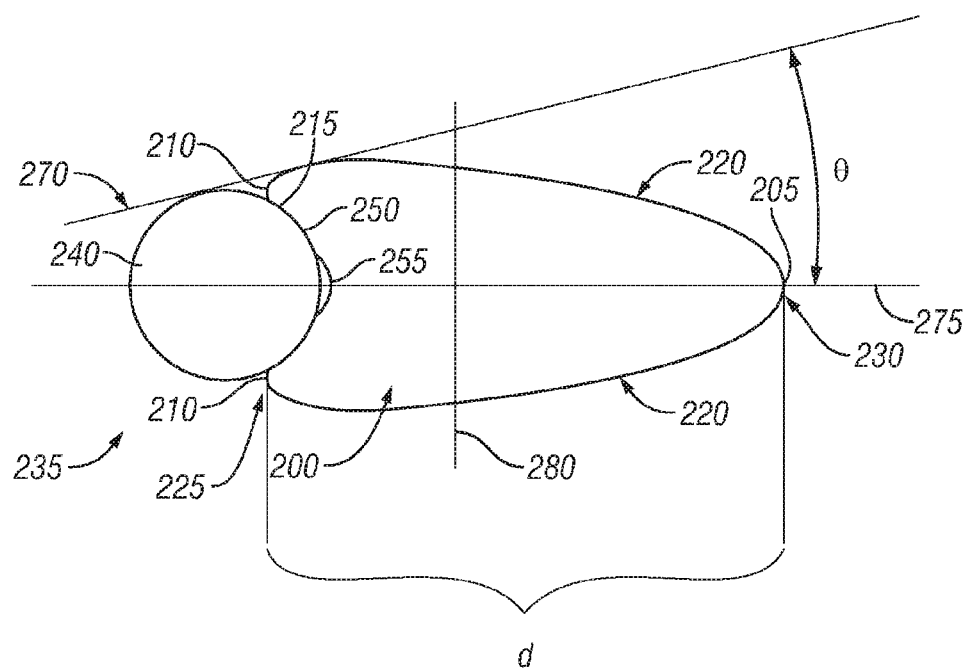
FIG. 3 is a diagrammatic representation of one embodiment of a cross-section of a rim and tire.

FIG. 3 is a diagrammatic representation of one embodiment of a cross-section of bicycle wheel 235 comprising rim 200 and tire 240. Tire mounting surface 215 forms a tire bed 250 in which tire 240 seats. Additionally, tire mounting surface 215 can form a groove 255 in which stitching of tire 240 can rest. Rim 200 can have a depth "d" and be configured to fit tires of a particular size or range of sizes with rim 200 being wider than the width of tire 240 at or proximate to the outer edge 210. The depth of rim 200 can be selected as desired. Typical rim depths for non-disc wheels range from 30 mm-110 mm, though other depths can be used.

The shape of rim 200 can be selected so that there is a tangent line 270 from tire 240 to sidewall 220. Tangent line 270 can be tangent to rim 200 at any point along sidewall 220. According to one embodiment, tangent line 270 can be tangent to sidewall 220 at the widest part of rim 200. For example, the widest part of rim 200 can occur at i) the radial outer third of rim 200, ii) the radial inner third of rim 200, iii) the radial centerline of rim 200, iv) the radial centerline of the cross section of rim 200 and tire 240 or v) other portion of wheel 240.

In the embodiment of FIG. 3, wheel 235 is symmetrical about axis 275 but not symmetrical about axis 280. This asymmetry results because the widest portion of rim 200 does not fall near axis 280 and nose 230 does not have substantially the same radius as tire 240. Consequently, wheel 235 does not have a substantially elliptical or otherwise symmetrical shape about axis 280. In other embodiments, rim 200 can have a substantially symmetrical shape about both axis 275 and axis 280. Such substantially symmetrical shapes include, but are not limited to, elliptical (oval) and lenticular shapes.

FIG. 4 is a diagrammatic representation of another embodiment of a cross section of a wheel 400 comprising rim 405 and a tire (three different sizes of tires are illustrated, represented at 410', 410" and 410'''). Rim 405 can have a depth "d" from an outer edge 470 to inner edge 415. Tire seating surface 420 can be shaped to receive the tire in a tire bed 425. In one embodiment, tire bed 425 can include a groove 430 in which stitching of the tire rests. Tire bed 425 can be shaped to fit a tire of a selected size or tires in a range of sizes.

Rim 405 is shaped so that the width of rim 405 at or proximate to the outermost radial edge 470 of rim 405 is wider than the width of the tire (e.g., at a portion of the rim that overlaps the tire bed). Additionally, rim 405 is shaped so that there is a line tangent to the tire (three different tangent lines are illustrated as tangent lines 440', 440" and 440''' for tires 410', 410" and 410''') and tangent to sidewall 435. In one embodiment, the tangent line is tangent to rim 405 further outward than the widest portion of rim 405 radially outward from the widest portion of rim 405 (represented at 437). In other embodiments, the tangent line can be tangent at the widest part of rim 437. The widest portion of rim 405 can be at a desired location such as at the outermost radially outer third of rim 405 (including at the radially outer edge 470 of rim 405) the radial centerline of wheel 400 (near the transverse centerline of the cross section of the rim and tire indicated at line 475), the centerline of rim 405, the radially inner third of rim 405 or other selected location. In the example of FIG. 4, the widest portion of rim 405 is widest at the radial outer third of rim 405. As shown in FIG. 4, the widest portion of the rim indicated at 437 occurs closer to the tire bed than to the centerline 475 of the cross section of the rim and tire. The widest portion, in this embodiment, also occurs closer to the tire bed than to the centerline of rim 405. While the example of FIG. 4 has an asymmetrical shape about line 475 with the widest portion of rim 405 located away from the centerline 475 and nose 480 having a diameter that is smaller than the width of the tire, other embodiments of wheel 400 can be substantially elliptical or have other symmetrical shapes. Furthermore, in FIG. 4, the distance from the tire bed to the nose is greater than the width of the tire and more specifically, in the example of FIG. 4, greater than twice the width of the tire.

FIG. 4 illustrates tangent lines 440', 440" and 440''' for different sized tires 410', 410" and 410'''. As one example, line 440' for tire 410' has an angle of 14° to the lateral centerline, line 440" has an angle of 12° to the lateral centerline and line 440''' for tire 410''' has an angle of 9° to the lateral centerline. For a given rim shape, increasing the angle of the tangent line will typically increase the stall angle of wheel 400. Consequently, smaller width tires can lead to increased stall angles. It should be noted that the example angles are provided by way of example and not limitation.

In the embodiment of FIG. 4, a majority of the tire is shown as exposed above the outermost portion of rim 405. However, the tire is seated deeper than with traditional rims leading to a more unified aerodynamic shape. By way of example, but not limitation, 20-80% of the tire can be seated, leaving 80-20% of the tire exposed past the outermost edge of the rim. Seating the tire more deeply will increase the tangent angle, thereby increasing stall angle. Additionally, seating the tire more deeply can allow more adhesive to be used between the tire and tire bed 425 and allow tire bed 425 to provide more support for the tire. This reduces the likelihood of the tire rolling out of bed 425 during hard cornering, thereby decreasing the likelihood of accidents.

According to one embodiment, the area of sidewall 435 under the tangent line (shown at 465) can have a tapered or curved shape to promote attached flow. In other embodiments, area 465 may be straight or include a transition to surface 420. The area closer to inner side 415 can have any desired shape. According to one embodiment, sidewalls 435 can have a curved shape to maintain attached or smooth flow for as long as possible. In such an embodiment, sidewall 435 can be curved where the bicycle's brake pads contact rim 405. This can lead to better braking as the brake pads wear into a curved shape having larger braking area. In other embodiments, sidewalls 435 can have straight braking surfaces.

FIG. 5 is a diagrammatic representation of a cross section of another embodiment of a wheel 500 having rim 505 and a tire (three different sizes of the tire are represented by tires 510', 510" and 510'''). Rim 505 can be shaped to be wider than the tire at or proximate to the radially outer edge of rim 505 and to be widest radially closer to the tire bed than the centerline of the cross section and to be widest radially closer to the tire bed than the centerline of rim 505. Additionally, rim 505 can be shaped so that there is a tangent line tangent to the tire and sidewall 525 (tangent lines from tires 510', 510" and 510''' to sidewall 525 are shown by 520', 520" and 520''' respectively). The tangent line can be tangent to sidewall 525 at the widest portion of rim 505 or at some other point along sidewall 525. In FIG. 5, for example, the tangent line is tangent to rim 505 radially outward on sidewall 525 from the widest part of rim 505 (represented at line 530). As in the previous examples, the widest portion of rim 500 is located away from transverse centerline 535 causing rim 500 to be asymmetrical. In other embodiments, however, rim 500 can be substantially symmetrical about the transverse centerline. Furthermore, in FIG. 5, the distance from the tire bed to the nose is greater than the width of the tire and more specifically, in the example of FIG. 5, greater than three times the width of the tire.

Testing of various embodiments has shown that the stall angle can be at least the tangent angle and the stall angle increases as the depth of the rim depth of the rim increases. As one example, one embodiment of a 60 mm wheel with a 12.5 degree tangent angle may exhibit a stall angle of 15 degrees while a 90 mm rim with a 12.5 degree tangent angle may exhibit a stall angle of 16 degrees. Thus, if tangent lines 520', 520" and 520''' have angles as tangent lines 440', 440" and 440''' of FIG. 4, wheel 500 will have a higher stall angle than wheel 400 for each tangent angle. The amount of increase in stall angle due to depth decreases as the tangent angle increases.

FIG. 6 is a diagrammatic representation of a cross section of another embodiment of a wheel 600 having a rim 605 with a tire 610 seated in tire bed 615. Rim 605 is shaped so that there is tangent line tangent to tire 610 and the sidewall of rim 605. In the embodiment of FIG. 6, the outer edge 620 of rim 605 has a width that is approximately equal to the width of tire 610 (as shown by line 625). However, rim 605 is shaped such that rim 605 is wider than the width of tire 610 proximate to edge 620 at a point that overlaps tire bed 615 as shown by line 630. Thus, even if the very outer edge 620 of rim 605 is not wider than the width of tire 610, rim 605 is still wider than tire 610 near outer edge 620. In one embodiment, rim 605 can be wider than tire 610 at any point that overlaps tire bed 615. In other embodiments, rim 605 can be wider than tire 610 within 2 mm or less of the outer edge of rim 605.

FIG. 7 is a diagrammatic representation of a cross section of another embodiment of a wheel 700 having a rim 705 with a tire 710 seated in tire bed 712. According to one embodiment, rim 705 can be shaped so that rim 705 is wider than the width of tire 710 proximate to outer edge 717 and so that there is a tangent line 715 from tire 710 to rim 705. The tangent line 715, in the example of FIG. 7, is tangent to rim 705 at the radially outer part of sidewall 720 where the transition 725 to the circumferential tire seating surface begins. Additionally, in the embodiment of FIG. 7, the widest portion of the rim 705, represented by line 730, occurs near outer edge 717 so that the widest area of rim 705 overlaps tire bed 712. While tangent line 715 is tangent to rim 705 at the widest part of rim 705, tangent line 705 can be tangent elsewhere on rim 705.

Figure 8:
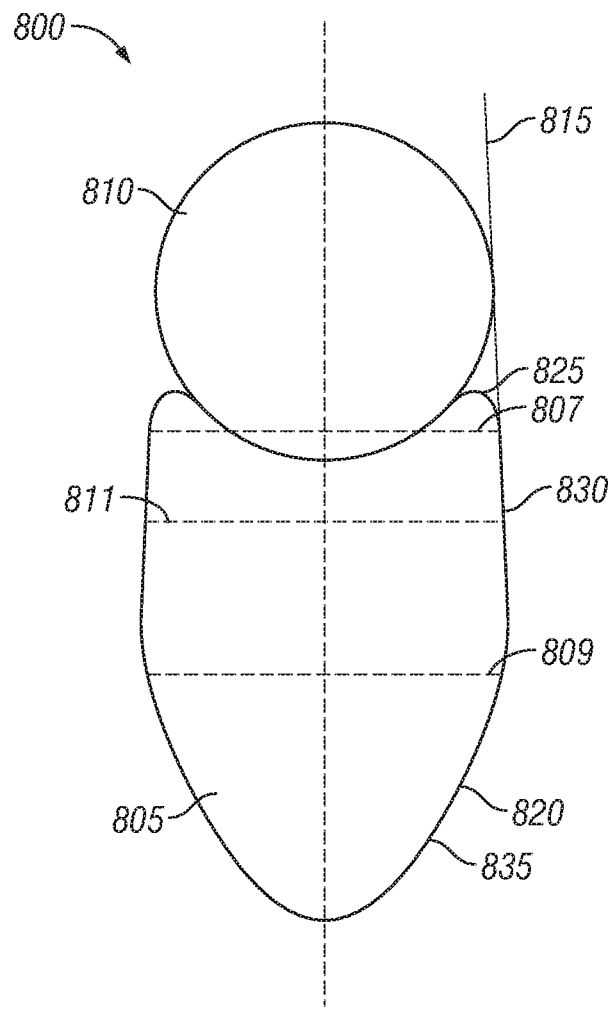
FIG. 8 is a diagrammatic representation of another embodiment of a cross section of a rim and tire.

FIG. 8 is a diagrammatic representation of a cross section of another embodiment of a wheel 800 comprising a rim 805 seating a tire 810. Rim 805 is wider than wheel 810 proximate to the outer edge (represented at line 807) at a portion of rim 805 that overlaps the tire bed. Additionally, rim 805 is widest radially outward of the centerline of rim 805 (represented at line 809) but more inward than the centerline of the cross section of rim 805 and tire 810 as a whole (represented at line 811). Rim 805 is also shaped so that there is a tangent line 815 tangent to tire 810 and the sidewall 820 of rim 805, the transition 830 from the sidewall 820 to the tire seating surface or other point on rim 805. Tangent line 815 can be tangent to rim 805 at the widest portion of rim 805 or another portion of rim 805.

According to one embodiment, sidewall 820 includes substantially flat braking surface 830. From the perspective of FIG. 8, braking surface 830 can be vertical or may taper outward so that rim 805 becomes wider. Sidewall 820 can also include a curved or otherwise shaped section 835. According to one embodiment, braking surface 830 can extend from transition 825 to the widest portion of rim 805. In other embodiments, sidewall 820 can bow out after braking surface 830. Wheel 800, in the embodiment illustrated, is not substantially elliptical as the widest part of rim 805 is offset from centerline 809 and nose 835 is not shaped to match the radius of tire 810. In other embodiments, wheel 800 can be elliptical or have another substantially symmetrical shape about centerline 809.

In the previous embodiments, rims are shaped so that there is a tangent line tangent to the tire and the sidewall of the rim. In other embodiments, the rim can be shaped so that there is a tangent line tangent to another point on the rim. FIG. 9 is a diagrammatic representation of a cross section of one embodiment of a wheel 900 having a rim 905 seating a tire 910. Rim 905 can be shaped to be wider than the width of tire 910 at or proximate to the outer edge of rim 905. Additionally, rim 905 can be shaped so that there is a tangent line 915 tangent to tire 910 and rim 905. In the embodiment of FIG. 9, tangent line 915 is tangent at the transition 920 from sidewall 925 to tire seating surface 930. Transition 920 is illustrated as being an approximately right angle corner, but in other embodiments, transition 920 between the sidewall 925 and tire seating surface 930 can have other shapes including, but not limited, curves of relatively small radius as shown in the embodiments of FIGS. 3-6.

Wheel 900 is asymmetrical about the centerline of the cross-section of rim 905 and tire 910 (represented at 935)

with the widest part of rim 905 (represented by line 940) is offset radially outward from centerline 935 of the cross section of the rim and tire. Additionally, nose 945 has a different radius than tire 910. Consequently, in the embodiment illustrated, the cross-section of rim 905 and tire 910 is not substantially elliptical or otherwise symmetrical about centerline 935.

FIGS. 3-9 illustrate embodiments using tubular tires. However, aerodynamic rims can also be formed to seat clincher tires. FIG. 10 is a diagrammatic representation of a cross section of wheel 1000 having a rim 1005 seating clincher tire 1010 (two size tires are illustrated, represented by 1010' and 1010"). Rim 1005 is wider than the width of tire 1010 radially inward from the outer edge of rim 1005. Additionally, rim 1005 can be shaped so that there is a tangent line 1015 (represented at 1015' and 1015" for tires 1010' and 1010", respectively) tangent to rim 1005 and tire 1010. Tangent line 1015 can be tangent to rim 1005 on sidewall 1020, the transition 1025 between the sidewall and outer surface of rim 1005 or at another point on rim 1005. Tangent line 1005 can be tangent to rim 1005 at the widest portion of rim 1005 or other portion of rim 1005. In one example, tangent line 1015 may be tangent to rim 1005 further outward on rim 1005 than the widest portion of rim 1005, as illustrated by line 1015', for example.

Figure 11:
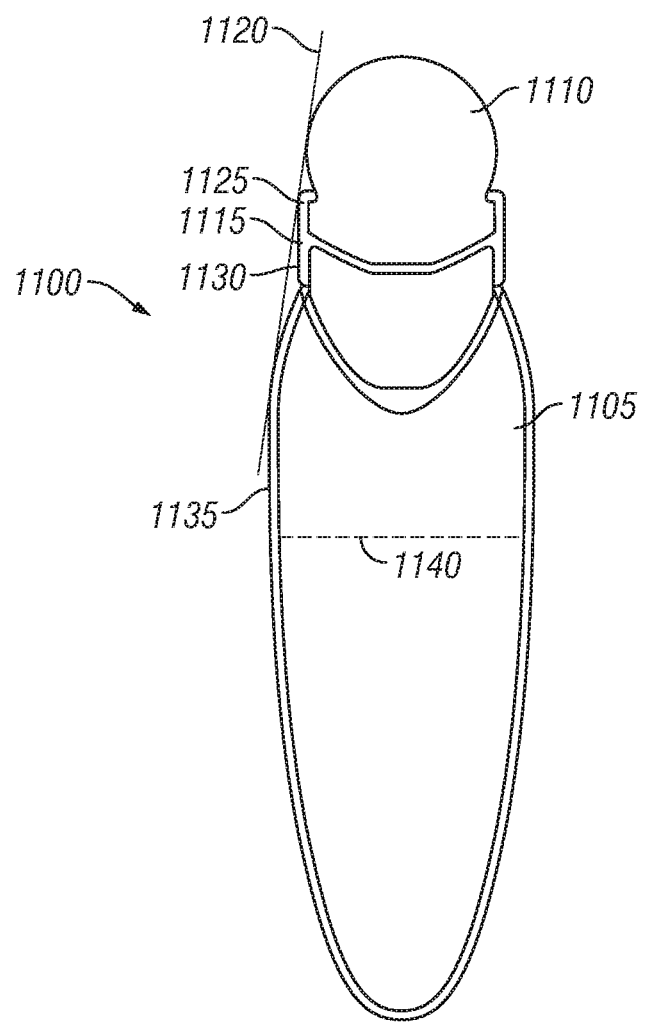
FIG. 11 is a diagrammatic representation of another embodiment of a cross-section of a rim and tire.

FIG. 11 is a diagrammatic representation of a cross section of another embodiment of a wheel 1100 having a rim 1105 configured for a clincher tire 1110. Rim 1105 can include a clinching portion 1115 for seating clincher tire 1110. Clinching portion 1115 can be integral with or a separate component from the rest of rim 1105. According to one embodiment, clinching portion 1115 can provide parallel braking surfaces (e.g., braking surface 1130).

Rim 1105 is wider than tire 1110 at or proximate to the outer edge of clinching portion 1115. Additionally, rim 1105 can be shaped so that there is a tangent line 1120 tangent to tire 1110 and rim 1105. Tangent line 1120 can be tangent to rim 1105 at clinching portion 1115 or elsewhere on rim 1105. While the cross-section of FIG. 11 is non-elliptical or otherwise asymmetrical about the centerline of the cross section of rim 1105 and tire 1110 (represented at 1140), other embodiments of rims using clincher tires can be substantially symmetrical or elliptical.

Figure 12A:
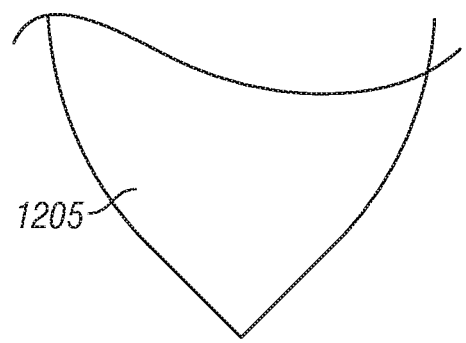
FIGS. 12A, 12B, and 12C are diagrammatic representations of embodiments of rim noses.
Figure 12B:
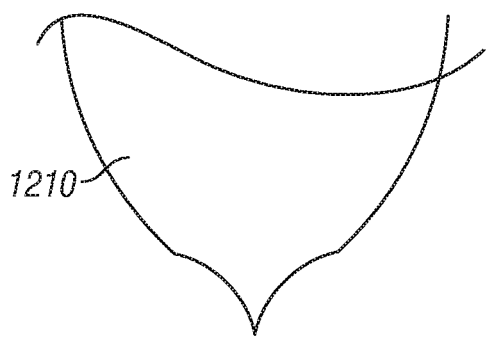
Figure 12C:
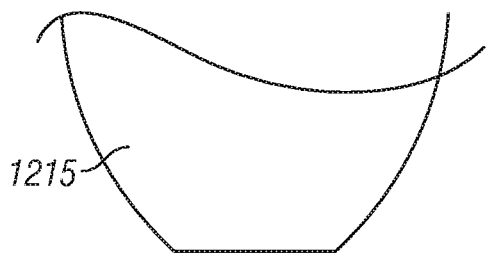

As described above various embodiments of rims can be shaped so that the rim and tire form an asymmetrical cross-section. One factor that can cause the cross-section to be non-elliptical or asymmetrical is the nose shape. In the above embodiments, the nose of each rim is shown as being rounded with a smaller radius than that of the tire. However, any desired nose shape can be used. FIGS. 12A-12C, for example, illustrate various embodiments of a nose, including a straight tapered nose 1205, a reverse curved nose 1210, and a flat nose 1215 that can cause a cross-section to be non-elliptical. The embodiments of FIGS. 12A-12C are provided by way of example and other embodiments of noses can be used as needed or desired.

Figure 13:
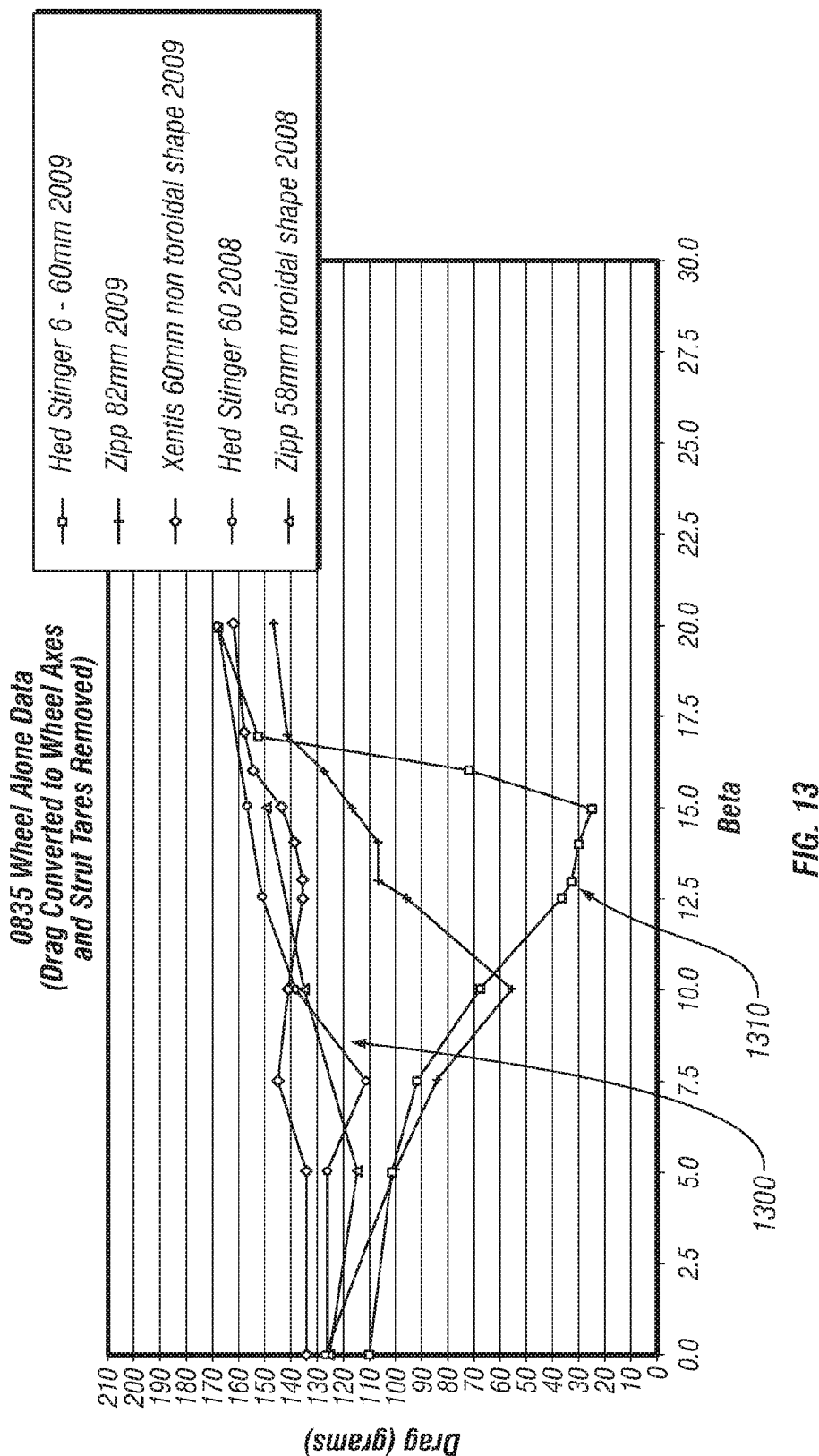
FIG. 13 is a chart illustrating test data for embodiments of rims.

Empirical testing has shown reduced drag and increased stall angles for rims according to embodiments of the present disclosure. FIG. 13 is a graph comparing yaw (x-axis) to drag (y-axis) for various wheels including a 2008 model HED Stinger 6 with a 60 mm depth by HED Cycling Products USA, of Shoreview, Minn. (represented by line 1300) and a 2009 model HED Stinger 60 (represented by line 1310). The 2008 Model had a rim that was thinner than the width of the tire proximate to the outer edge and had its maximum width near the transverse axis of the wheel. The 2009 HED Stinger 60 was formed according to FIG. 3 having a depth "d" of 60 mm. In both cases a 21 mm tire was used. FIG. 13 illustrates that the 2008 has a stall angle of about 7.5 degrees while the 2009 model exhibits a stall angle of about 15 degrees. Various embodiments of rims can be shaped to have a desired stall angle.

According to one embodiment, a rim shape is selected so that a tire bed is at least large enough to seat a portion of a tire having a selected width and have a rim width larger than the width of the reference circle at or proximate to the outermost edge of the rim. Additionally, the rim shape can be selected so that there is a line tangent to the tire and the rim. In one embodiment, the tangent line can be tangent to the sidewall of the rim or other portion of the rim. The line can be tangent to the sidewall at the widest part of the rim or at another part of the rim. In one embodiment, the widest part of the rim can be located at the radially outer third of the rim up to the outermost edge of the rim, the radially inner third of the rim or at another portion of the rim. The rim shape can be selected so that the wheel forms a non-elliptical shape or, in other embodiments, forms and elliptical shape.

The remainder of the rim can have a tapered shape or other shape known or developed in the art. The rim can be manufactured with a tire bed adapted to receive tubular or clincher tires. According to one embodiment, a rim adapted to receive a clincher tire can be shaped so that the tire bead is frontally flush with the rim.

Figure 14:
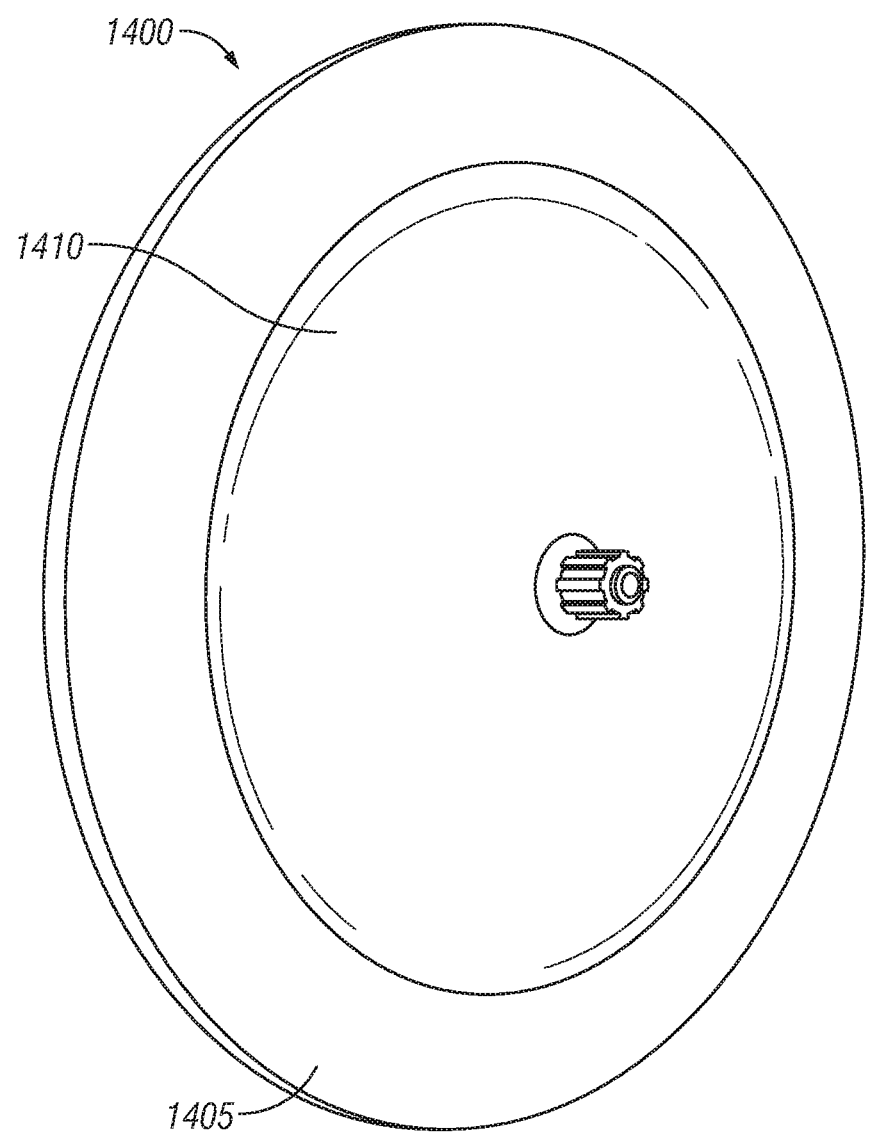
FIG. 14 illustrates an embodiment of a disc wheel.
Figure 15:
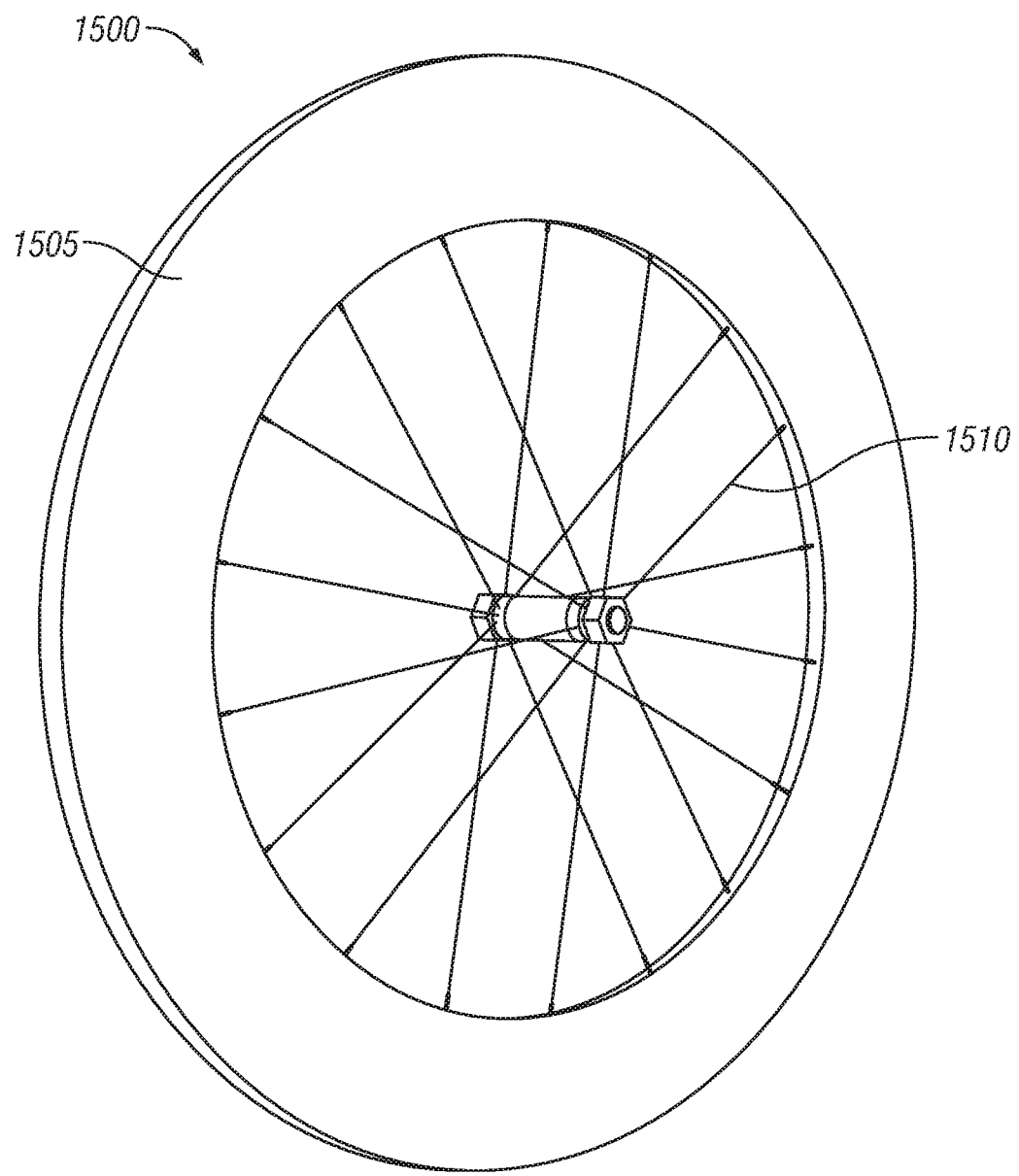
FIG. 15 illustrates another embodiment of a wheel.

Additionally, embodiments of rims according to this disclosure can be used with disc wheels, traditional spoke wheels, three spoke wheels or other bicycles wheels known or developed in the art. For example, FIG. 14 is a diagrammatic representation of one embodiment of a disc wheel 1400. Disc wheel 1400 includes a rim body 1405 that can be shaped as described above that is connected to or transitions to an inner disc 1410. FIG. 15 is a diagrammatic representation of a wire spoke wheel 1500 that includes a rim body 1505 that can be shaped as described above and is coupled to a set of wire spokes 1510.

Rims can be used with mountain bike tires or other bicycle tires. The rim can be sized to fit standard size bicycle forks and components or custom forks or components. The rim can be made from any suitable material including, but not limited to, steel, stainless steel, titanium, aluminum, carbon fiber or other materials including metals, composites or polymers and can be formed in a single part or multi-part process. The rim can be solid or filled with a filler material.

In the foregoing specification, the disclosure has been described with reference to specific embodiments. However, as one skilled in the art can appreciate, embodiments of rims and wheels described herein can be modified or otherwise implemented in many ways without departing from the spirit and scope of the disclosure. Accordingly, this description is to be construed as illustrative only and is for the purpose of teaching those skilled in the art the manner of making and using other embodiments. It is to be understood that the forms of the disclosure herein shown and described are to be taken as exemplary embodiments. Equivalent elements or materials may be substituted for those illustrated and described herein. Moreover, certain features of the disclosure may be utilized independently of the use of other features, all as would be apparent to one skilled in the art after having the benefit of this description of the disclosure.

What is claimed is:
1. An aerodynamic bicycle rim comprising:
a circumferential tire mounting surface on a radially outer side of the bicycle rim forming a tire bed to seat a tire; and a set of sidewalls, each sidewall extending radially from a nose of the bicycle rim to a corresponding transition to the circumferential tire mounting surface to form a bicycle rim body having a maximum rim body width at a portion of the rim body that overlaps the tire bed, the maximum rim body width greater than a maximum width of the tire;

wherein, the bicycle rim is operable to seat the tire so that the cross-sectional shape of the tire and rim body is asymmetrical about the widest portion of the cross-sectional shape and there is a tangent line tangent to the tire and tangent to a sidewall of the bicycle rim radially inward from a radially outermost edge of the rim body having a tangent angle of 8-17 degrees, wherein the rim is configured such that a wheel formed by the rim and tire has a stall angle of 10-19.5 degrees when the tire is seated.

2. The bicycle rim of claim 1, wherein the tangent line is tangent to the sidewall radially outward from a widest part of the bicycle rim.

3. The bicycle rim of claim 1, wherein the tangent line is tangent to the sidewall at a widest part of the bicycle rim.

4. The bicycle rim of claim 1, wherein the bicycle rim is widest radially inward of approximately the beginning of the transition between the sidewall and the circumferential tire mounting surface.

5. The bicycle rim of claim 1, wherein the bicycle rim is shaped so that the bicycle rim and tire form an asymmetrical shape about a centerline of a cross-section of the bicycle rim and tire.

6. The bicycle rim of claim 1, wherein the tangent line has a tangent angle between 9 and 14 degrees.

7. The bicycle rim of claim 6, wherein the rim is configured such that the wheel formed by the tire and rim has a stall angle of at least 14 degrees.

8. A bicycle wheel comprising:
a bicycle tire;
an aerodynamic bicycle rim seating the tire, the bicycle rim comprising:
a circumferential tire mounting surface on a radially outer side of the bicycle rim forming a tire bed to seat a tire; and
a set of sidewalls, each sidewall extending radially from a nose of the bicycle rim to a corresponding transition to the circumferential tire mounting surface to form a bicycle rim body having a maximum rim body width at a portion of the rim body that overlaps the tire bed, the maximum rim body width greater than a maximum width of the tire;

wherein, the bicycle rim is operable to seat the tire so that the cross-sectional shape of the tire and rim body is asymmetrical about the widest portion of the cross-sectional shape and there is a tangent line tangent to the tire and tangent to a sidewall of the bicycle rim radially inward from a radially outermost edge of the rim body having a tangent angle of 8-17 degrees, wherein the rim is configured such that a wheel formed by the rim and tire has a stall angle of 10-19.5 degrees when the tire is seated.

9. The bicycle wheel of claim 8, wherein the tangent line is tangent to the sidewall radially outward from a widest part of the bicycle rim.

10. The bicycle wheel of claim 8, wherein the tangent line is tangent to the sidewall at a widest part of the bicycle rim.

11. The bicycle wheel of claim 8, wherein the bicycle rim is widest radially inward of approximately the beginning of the transition between the sidewall and the circumferential tire mounting surface.

12. The bicycle wheel of claim 8, wherein the bicycle rim is shaped so that the bicycle rim and tire form an asymmetrical shape about a centerline of a cross-section of the bicycle rim and tire.

13. The bicycle wheel of claim 8, wherein the bicycle rim is wider than the maximum width of the tire at the radially outermost edge of the rim body.

14. The bicycle wheel of claim 8, wherein the tangent line has a tangent angle between 9 and 14 degrees.

15. The bicycle wheel of claim 14, wherein the rim is configured such that the wheel formed by the tire and rim has a stall angle of at least 14 degrees.

* * * * *